US012701217B2

(12) United States Patent (10) Patent No.: US 12,701,217 B2
Park et al. (45) Date of Patent: Aug. 4, 2026

(54) VIDEO ENCODING/DECODING METHOD AND APPARATUS

(71) Applicants:HYUNDAI MOTOR COMPANY, Seoul (KR); KIA CORPORATION, Seoul (KR)

(72) Inventors: Seung Wook Park, Yongin-si (KR); Jin Heo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/598,840

(22) Filed: Mar. 7, 2024

(65) Prior Publication Data

US 2024/0214556 A1 Jun. 27, 2024

Related U.S. Application Data

(63) Continuation of application No. PCT/KR2022/013483, filed on Sep. 7, 2022.

(30) Foreign Application Priority Data

Sep. 8, 2021 (KR) .......................... 10-2021-0119693
Sep. 1, 2022 (KR) .......................... 10-2022-0110571

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/196* (2014.11)

(58) Field of Classification Search
CPC ........................... H04N 19/105; H04N 19/159
See application file for complete search history.

(56) References Cited

U.S. PATENT DOCUMENTS 11,095,917 B2    8/2021  Zhang
11,115,676 B2    9/2021  Zhang
(Continued)

FOREIGN PATENT DOCUMENTS

JP      2021114781 A    8/2021
KR    20190056332 A    5/2019
(Continued)

OTHER PUBLICATIONS

International Search Report and Written Opinion cited in corresponding international patent application No. PCT/KR2022/013483; Sep. 7, 2022; 11 pp.
(Continued)

*Primary Examiner* — Irfan Habib
(74) *Attorney, Agent, or Firm* — Lempia Summerfield Katz LLC

(57) ABSTRACT

A method and a device for encoding/decoding a video are provided. A method for decoding a video according to the present disclosure includes generating an inter-prediction block of a current block based on a reference block corresponding to the current block and present in a reference picture. The method also includes generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block. The method also includes generating a
(Continued)

combined inter-intra prediction (CIIP) block of the current block by weighted averaging the inter-prediction block and the intra-prediction block.

20 Claims, 26 Drawing Sheets

(51) Int. Cl.

| | | |
|---|---|---|
| *H04N 19/176* | (2014.01) | |
| *H04N 19/196* | (2014.01) | |

(56) References Cited

U.S. PATENT DOCUMENTS

| | | | | |
|---|---|---|---|---|
| 11,350,107 | B2 | 5/2022 | Jun et al. | |
| 11,825,113 | B2 | 11/2023 | Zhang | |
| 11,902,572 | B2 * | 2/2024 | Heo | H04N 19/176 |
| 11,936,911 | B2 * | 3/2024 | Koo | H04N 19/12 |
| 11,973,940 | B2 * | 4/2024 | Choi | H04N 19/11 |
| 12,126,822 | B2 * | 10/2024 | Li | H04N 19/11 |
| 12,143,598 | B2 * | 11/2024 | Lim | H04N 19/159 |
| 12,219,126 | B2 | 2/2025 | Xiu et al. | |
| 12,375,663 | B2 * | 7/2025 | Li | H04N 19/119 |
| 2019/0215521 | A1 * | 7/2019 | Chuang | H04N 19/105 |
| 2020/0288157 | A1 | 9/2020 | Li et al. | |
| 2020/0322623 | A1 * | 10/2020 | Chiang | H04N 19/46 |
| 2020/0336739 | A1 * | 10/2020 | Choi | H04N 19/11 |
| 2020/0366900 | A1 * | 11/2020 | Jun | H04N 19/105 |
| 2021/0160525 | A1 | 5/2021 | Zhang | |
| 2021/0160533 | A1 | 5/2021 | Zhang | |
| 2021/0211651 | A1 | 7/2021 | Takehara | |
| 2021/0377561 | A1 | 12/2021 | Zhang | |
| 2022/0070441 | A1 | 3/2022 | Xiu | |
| 2022/0272357 | A1 | 8/2022 | Jun et al. | |
| 2022/0321880 | A1 | 10/2022 | Kang | |
| 2022/0385917 | A1 | 12/2022 | Bordes et al. | |
| 2022/0417511 | A1 * | 12/2022 | Li | H04N 19/159 |
| 2023/0370618 | A1 | 11/2023 | Jun et al. | |
| 2024/0056599 | A1 | 2/2024 | Zhang | |
| 2025/0119532 | A1 | 4/2025 | Xiu et al. | |

FOREIGN PATENT DOCUMENTS

| | | |
|---|---|---|
| KR | 20210035067 A | 3/2021 |
| KR | 20210094530 A | 7/2021 |
| WO | 2020142279 A1 | 7/2020 |
| WO | 2021130025 A1 | 7/2021 |

OTHER PUBLICATIONS

Xinwei Li, et al., EE2-related: A combination of CIIP and DIMD/TIMD, JVET-W0068-v2, Joint Video Experts Team (JVET) of ITU-T SG 16 WP 3 and ISO/IEC JTC 1/SC 29, 23rd Meeting, by teleconference. pp. 5, Jul. 7, 2021.

Anthony Nasrallah et al., Decoder-side intra mode derivation based on a histogram of gradients in Versatile Video Coding, 2019 Data Compression Conference, 2019, DOI 10.1109/DCC2019.00109. 1pp.

Office action cited in Japanese application No. 2024-515458; May 26, 2026; 12 pp.

* cited by examiner

| Whether It Is Encoded As Intra Prediction Or Not | | Weighted Value (w) |
|---|---|---|
| Upper Neighboring Block (A) | Left Neighboring Block (L) | |
| O | O | 3 |
| O | X | 2 |
| X | O | 2 |
| X | X | 1 |

*FIG. 9*

| Q | A | B | C | D | E | F | G | H |
|---|---|---|---|---|---|---|---|---|
| I | | | | | | | | |
| J | Current block | | | | | | | |
| K | | | | | | | | |
| L | | | | | | | | |
| M | | | | | | | | |
| N | | | | | | | | |
| O | | | | | | | | |
| P | | | | | | | | |

FIG. 10

| 0 |
|---|
| 1 |
| 2 |
| 3 |

*FIG. 12B*

| The sub-block index | (wIntra, wInter) |
|:---:|:---:|
| 0 | (6, 2) |
| 1 | (5, 3) |
| 2 | (3, 5) |
| 3 | (2, 6) |

*FIG. 13*

| 3 | 3 | 3 | 3 | 3 | 3 | 2 | 2 |
|---|---|---|---|---|---|---|---|
| 3 | 3 | 3 | 3 | 3 | 2 | 2 | 2 |
| 3 | 3 | 3 | 3 | 2 | 2 | 2 | 1 |
| 3 | 3 | 3 | 2 | 2 | 2 | 1 | 1 |
| 3 | 3 | 2 | 2 | 2 | 1 | 1 | 1 |
| 3 | 2 | 2 | 2 | 1 | 1 | 1 | 1 |
| 2 | 2 | 2 | 1 | 1 | 1 | 1 | 1 |
| 2 | 2 | 1 | 1 | 1 | 1 | 1 | 1 |

FIG. 17A

| 1 | 1 | 1 | 1 | 1 | 1 | 2 | 2 |
|---|---|---|---|---|---|---|---|
| 1 | 1 | 1 | 1 | 1 | 2 | 2 | 2 |
| 1 | 1 | 1 | 1 | 2 | 2 | 2 | 3 |
| 1 | 1 | 1 | 2 | 2 | 2 | 3 | 3 |
| 1 | 1 | 2 | 2 | 2 | 3 | 3 | 3 |
| 1 | 2 | 2 | 2 | 3 | 3 | 3 | 3 |
| 2 | 2 | 2 | 3 | 3 | 3 | 3 | 3 |
| 2 | 2 | 3 | 3 | 3 | 3 | 3 | 3 |

*FIG. 17B*

| 3 | 3 | 3 | 3 | 3 | 3 | 3 | 3 |
|---|---|---|---|---|---|---|---|
| 3 | 2 | 2 | 2 | 2 | 2 | 2 | 3 |
| 3 | 2 | 2 | 2 | 2 | 2 | 2 | 3 |
| 3 | 2 | 2 | 1 | 1 | 2 | 2 | 3 |
| 3 | 2 | 2 | 1 | 1 | 2 | 2 | 3 |
| 3 | 2 | 2 | 2 | 2 | 2 | 2 | 3 |
| 3 | 2 | 2 | 2 | 2 | 2 | 2 | 3 |
| 3 | 3 | 3 | 3 | 3 | 3 | 3 | 3 |

FIG. 18A

| 1 | 1 | 1 | 1 | 1 | 1 | 1 | 1 |
|---|---|---|---|---|---|---|---|
| 1 | 2 | 2 | 2 | 2 | 2 | 2 | 1 |
| 1 | 2 | 2 | 2 | 2 | 2 | 2 | 1 |
| 1 | 2 | 2 | 3 | 3 | 2 | 2 | 1 |
| 1 | 2 | 2 | 3 | 3 | 2 | 2 | 1 |
| 1 | 2 | 2 | 2 | 2 | 2 | 2 | 1 |
| 1 | 2 | 2 | 2 | 2 | 2 | 2 | 1 |
| 1 | 1 | 1 | 1 | 1 | 1 | 1 | 1 |

FIG. 18B

VIDEO ENCODING/DECODING METHOD AND APPARATUS

CROSS-REFERENCE TO RELATED APPLICATION

This application is a continuation of International Application No. PCT/KR2022/013483, filed on Sep. 7, 2022, which claims priority to and the benefit of Korean Patent Application No. 10-2021-0119693, filed on Sep. 8, 2021, and Korean Patent Application No. 10-2022-0110571, filed on Sep. 1, 2022, the entire disclosures of each of which are incorporated herein by reference.

TECHNICAL FIELD

The present disclosure relates to a video encoding and decoding method and a video encoding and decoding apparatus. More particularly, the present disclosure relates to a video encoding and decoding method and a video encoding and decoding apparatus that utilize various intra-prediction modes in a combined inter-intra prediction (CIIP) mode to generate a prediction block of the current block.

BACKGROUND

The contents described below simply provide background information related to the present embodiment and do not constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video data include H.264/AVC, high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

The Combined Inter-Intra Prediction (CIIP) mode is a method of generating a prediction block of the current block by weighted averaging the intra-prediction signal and the inter-prediction signal. Performing the combined inter-intra prediction needs to utilize various intra-prediction modes and different weighting values.

SUMMARY

An object of the present disclosure is to provide a method and an apparatus for generating a prediction block of the current block based on a Combined Inter-Intra Prediction (CIIP) mode.

Another object of the present disclosure is to provide a method and an apparatus for determining various intra-prediction modes in a combined inter-intra prediction mode.

Another object of the present disclosure is to provide a method and an apparatus for determining various weighting values in a combined inter-intra prediction mode.

Another object of the present disclosure is to provide a method and an apparatus for improving video encoding/decoding efficiency.

Another object of the present disclosure is to provide a recording medium storing a bitstream generated by a video encoding/decoding method or a video encoding/decoding apparatus of the present disclosure.

Another object of the present disclosure is to provide a method and an apparatus for transmitting a bitstream generated by a video encoding/decoding method or an apparatus of the present disclosure.

According to a present disclosure, a video decoding method includes generating an inter-prediction block of a current block based on a reference block corresponding to the current block and present in a reference picture. The video decoding method also includes generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block. The video decoding method also includes generating a combined inter-intra prediction (CIIP) block of the current block by weighted averaging the inter-prediction block and the intra-prediction block.

According to the present disclosure, a video encoding method includes generating an inter-prediction block of a current block based on a reference block corresponding to the current block and present in a reference picture. The video encoding method also includes generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block. The video encoding method also includes generating a combined inter-intra prediction (CIIP) block of the current block by weighted averaging the inter-prediction block and the intra-prediction block.

In addition, according to the present disclosure, it is possible to provide a method of transmitting a bitstream generated by the video encoding method or apparatus according to the present disclosure.

In addition, according to the present disclosure, it is possible to provide a recording medium storing a bitstream generated by the video encoding method or apparatus according to the present disclosure.

In addition, according to the present disclosure, it is possible to provide a recording medium storing a bitstream received and decoded by the video decoding apparatus according to the present disclosure and used to reconstruct a video.

According to the present disclosure, the method and an apparatus may generate a prediction block of the current block based on a Combined Inter-Intra Prediction or CIIP mode.

In addition, according to the present disclosure, the method and an apparatus may determine various intra-prediction modes in a combined inter-intra prediction mode.

In addition, according to the present disclosure, the method and an apparatus may determine various weighting values in a combined inter-intra prediction mode.

In addition, according to the present disclosure, the method and an apparatus for improving video encoding/decoding efficiency may be provided.

The effects that may be obtained from the present disclosure are not limited to the effects mentioned above, and other effects not mentioned may be clearly understood by those having ordinary skill in the art from the description below.

BRIEF DESCRIPTION OF THE DRAWINGS

FIG. 9 is a diagram illustrating a method of determining a weighted value in a combined inter-intra prediction mode, according to at least one embodiment of the present disclosure.

FIG. 10 is a diagram illustrating neighboring blocks that are adjacent to the current block, according to at least one embodiment of the present disclosure.

FIG. 12A and FIG. 12B are diagrams illustrating a method of partitioning the current block into subblocks based on intra-prediction modes in a combined inter-intra prediction mode, according to at least one embodiment of the present disclosure.

FIG. 13 is a diagram illustrating weighted values assigned to subblocks, according to at least one embodiment of the present disclosure.

FIGS. 17A and 17B are diagrams illustrating weighted values of an intra prediction of an 8×8 block and weighted values of an inter prediction of the 8×8 block, according to at least one embodiment of the present disclosure.

FIGS. 18A and 18B are diagrams illustrating weighted values of an intra prediction of a block of size 8×8, according to another embodiment of the present disclosure.

DETAILED DESCRIPTION

Figure 1:
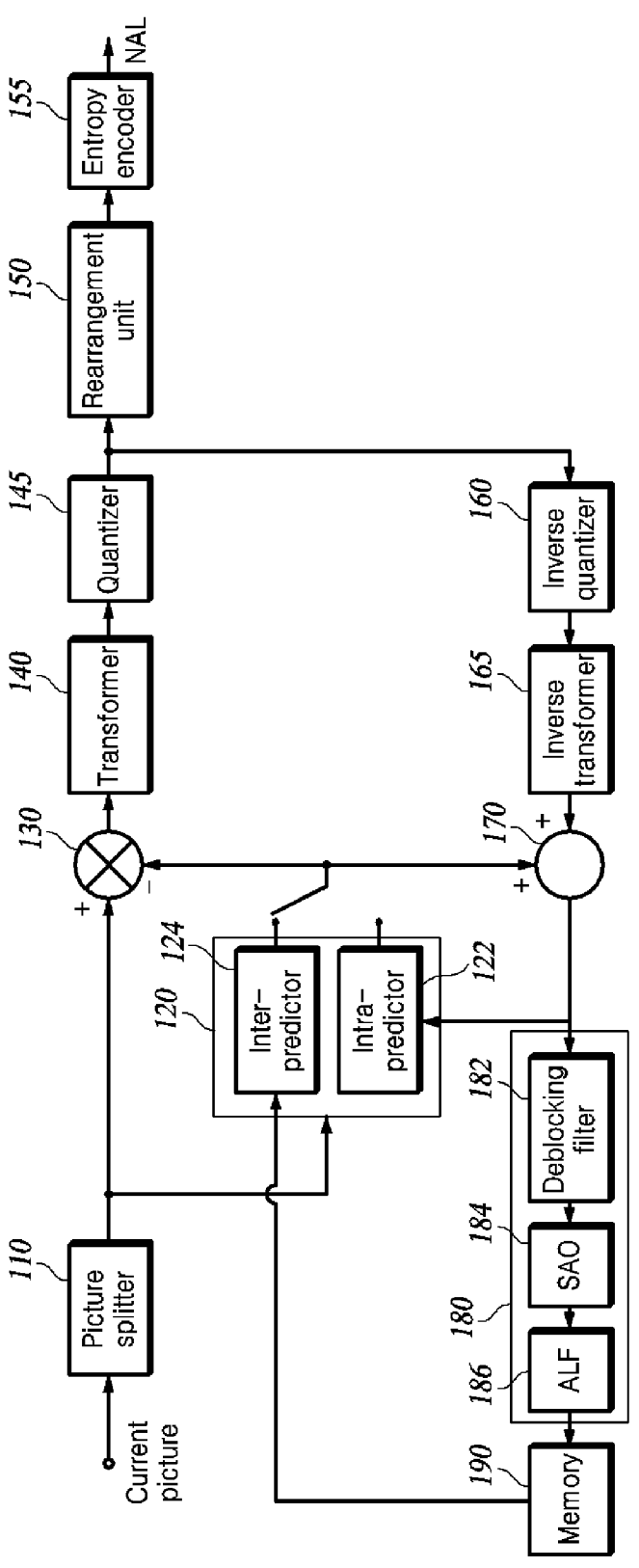
FIG. 1 is a block diagram of a video encoding apparatus that may implement a technology of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each more coding tree unit (CTU) is split into one or more coding units (CUs) by a tree structure. Information applied to each coding unit (CU) is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
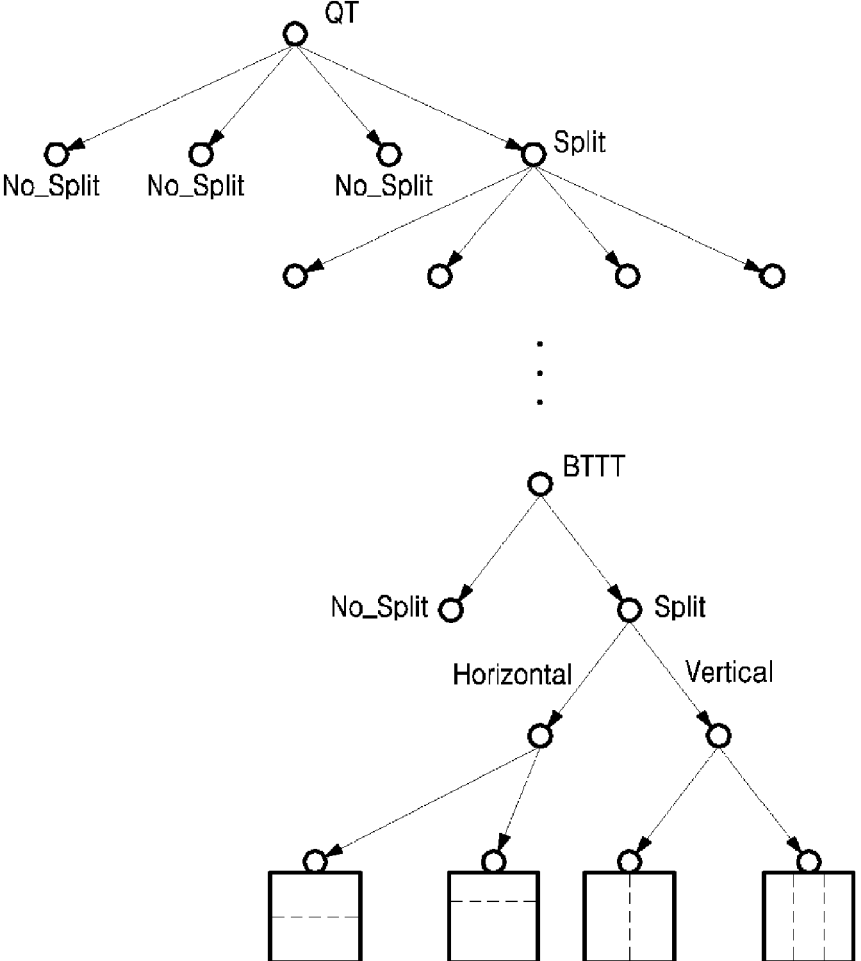
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
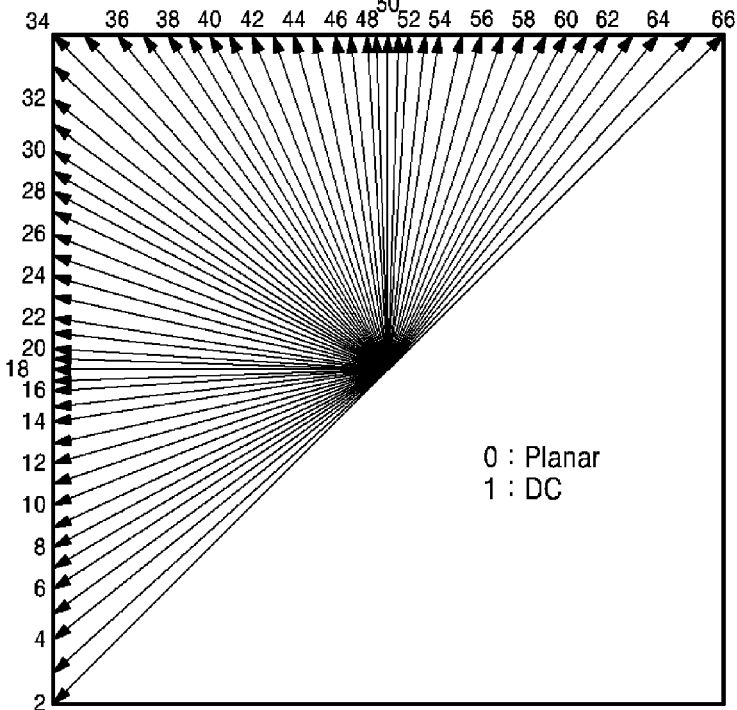
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
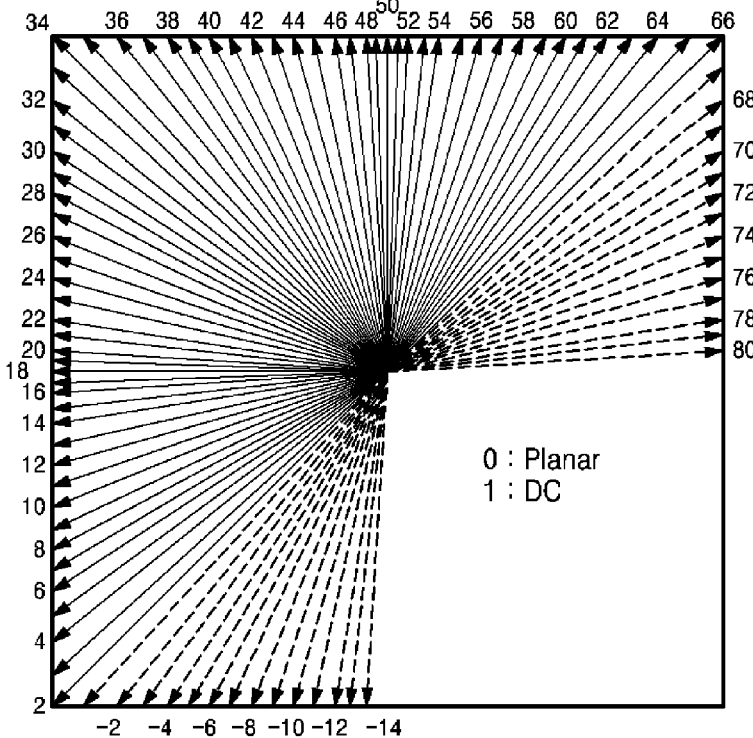

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
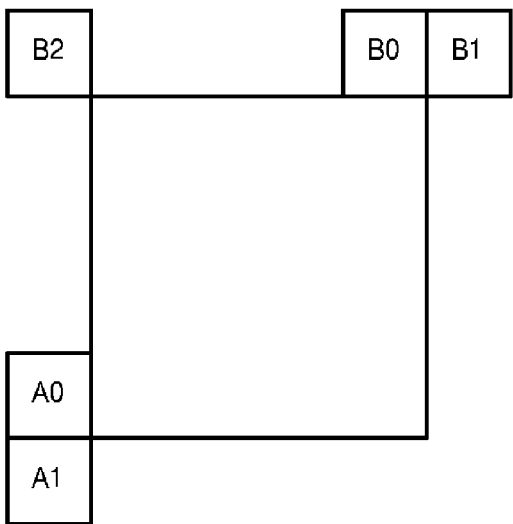
FIG. 4 illustrates neighboring blocks of a current block.

As a neighboring block for deriving the merge candidate, all or some of a left block A0, a bottom left block A1, a top block B0, a top right block B0, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, etc.) to the motion vector predictor candidates. In this case, the video decoding apparatus also knows the pre-defined function. Further, because the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or may also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
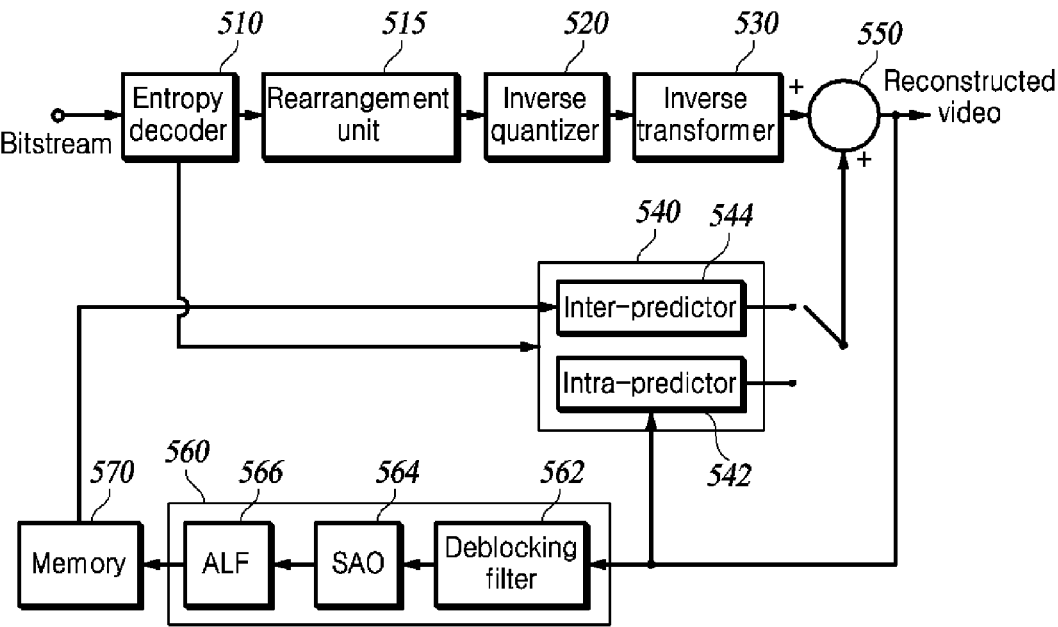
FIG. 5 is a block diagram of a video decoding apparatus that may implement technologies of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
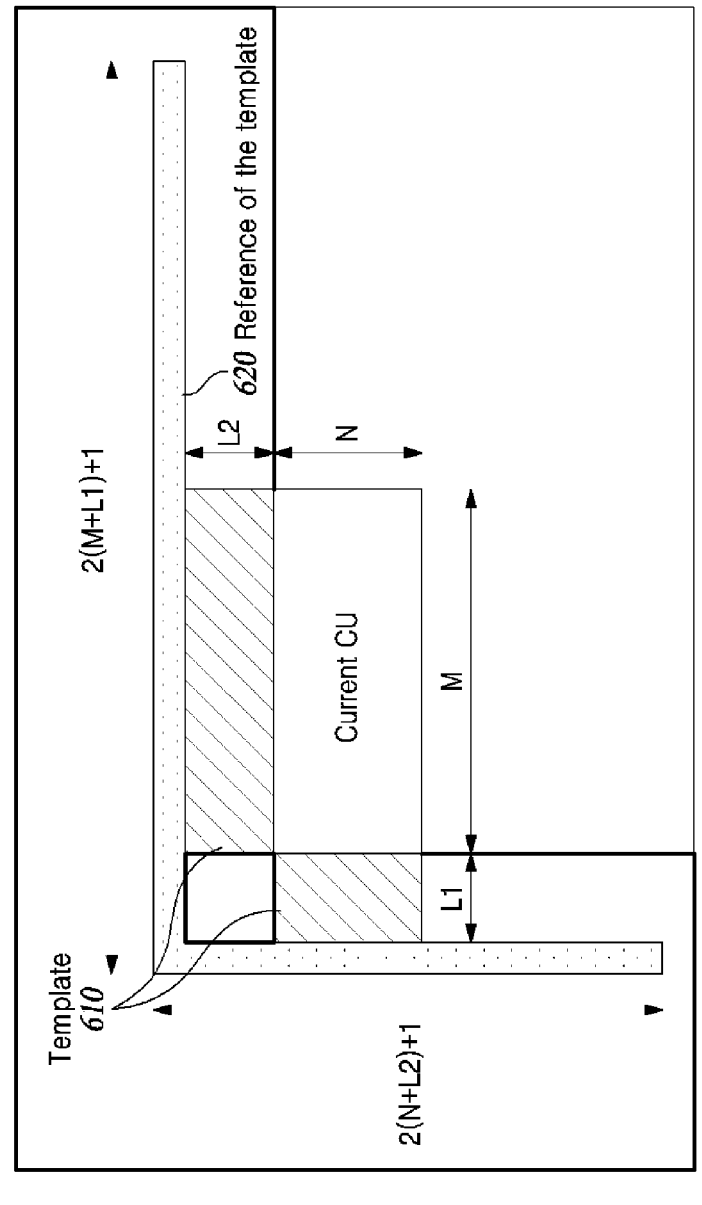
FIG. 6 is a diagram illustrating a template used to derive a template-based intra-prediction mode and a reference pixel of the template, according to at least one embodiment of the present disclosure.

FIG. 6 a diagram illustrating a template used to derive a template-based intra-prediction mode and a reference pixel of the template, according to at least one embodiment of the present disclosure. By using the template adjacent to the current block, the intra-prediction mode of the current block may be derived. By applying the directionality of all candidate modes in a Most Probable Mode (MPM) list to a reference pixel in the template, a prediction template may be generated. The Sum of Absolute Transformed Differences (SATD) between the pixels of the generated prediction template and the pixels of the already reconstructed template may be calculated. The mode that causes the sum of absolute transformed differences to be the least value among the MPM candidate modes is the intra-prediction mode of the current block derived by a template-based method of deriving the intra-prediction mode. The intra-prediction mode of the current block derived by the template-based method of deriving the intra-prediction mode may be used as an additional mode for the current Coding Unit (CU) block.

From the Sequence Parameter Set (SPS), a flag may be signaled indicating the use or non-use of the template-based method of deriving the intra-prediction mode. If the template-based method of deriving the intra-prediction mode is used, the present embodiment may use a CU-level flag to express whether to apply the template-based method of deriving the intra-prediction mode at the CU level. If the current CU block uses the template-based method of deriving the intra-prediction mode, the decoding apparatus may use the template-based method of deriving the intra-prediction mode to derive information on the intra-prediction mode of the current CU block. This may allow the omission of signaling of the syntax associated with the intra-prediction mode for the remaining luminance components.

Referring to FIG. 6, a template 610 used in the template-based method of deriving the intra-prediction mode may be adjacent to the top and left of the current block. A template's reference pixel 620 that is applied with the directionality of all candidate modes in the MPM list may exist adjacent to the template 610. The directionality of all candidate modes in the MPM list may be applied to the template's reference pixel 620 to generate a prediction template.

Figure 7:
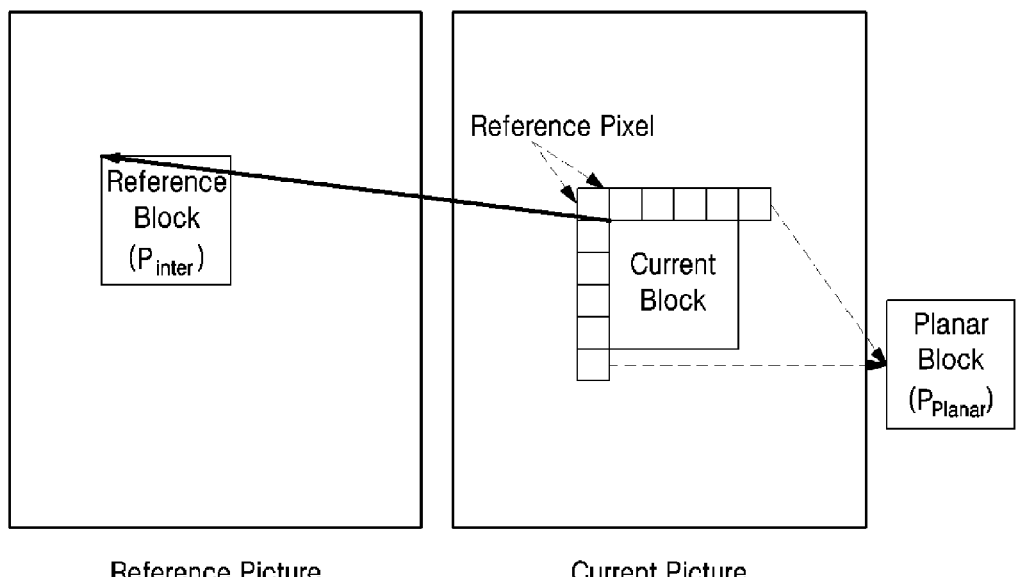
FIG. 7 is a diagram illustrating a method of generating a prediction block of the current block in a combined inter-intra prediction (CIIP) mode.

FIG. 7 is a diagram illustrating a method of generating a prediction block of the current block in a Combined Inter-Intra Prediction (CIIP) mode. Intra-prediction mode may be synonymous with intra-screen prediction mode. The terms intra-prediction mode and intra-screen prediction mode may be used interchangeably. Inter-prediction mode may be synonymous with inter-screen prediction mode. Inter-prediction mode and inter-screen prediction mode may be used interchangeably. A combined inter-intra-screen prediction mode may be synonymous with combined inter-intra prediction mode. Combined inter-intra prediction mode and CIIP mode may be used interchangeably. In CIIP mode, an inter-prediction block may be generated in the same way as in ordinary merge mode. An intra-prediction block may be generated by applying planar mode to neighboring reference pixels of the current block. By applying a weighted value to the generated inter-prediction block and intra-prediction block, a final CIIP-based prediction block may be generated.

Referring to FIG. 7, a reference block ($P_{inter}$) in the reference picture may be derived based on the merge mode. An intra-prediction block ($P_{Planar}$) may be generated by applying the planar mode to reference pixels neighboring the current block. By applying a weighted value to those reference block ($P_{inter}$) and intra-prediction block ($P_{Planar}$), a CIIP-based prediction block ($P_{CIIP}$) may be generated. The CIIP-based prediction block ($P_{CIIP}$) may be generated by using an equation of $P_{CIIP}=((4-w)\times P_{inter}+w\times P_{Planar}+2)\gg 2$.

Figure 8:
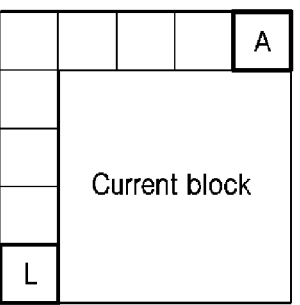
FIG. 8 is a diagram illustrating neighboring blocks that are referenced to determine a weighted value in a combined inter-intra prediction mode, according to at least one embodiment of the present disclosure.

FIG. 8 is a diagram illustrating neighboring blocks that are referenced to determine a weighted value in a combined inter-intra prediction mode, according to at least one embodiment of the present disclosure. In CIIP mode, the weighted value may be determined by taking into account whether the neighboring blocks adjacent to the current block encode intra-prediction mode.

Referring to FIG. 8, the weighted value in CIIP mode may be determined by taking into account whether the upper neighboring block A and the left neighboring block L, which are adjacent to the current block encode the intra-prediction mode.

FIG. 9 is a diagram illustrating a method of determining a weighted value in a combined inter-intra prediction mode, according to at least one embodiment of the present disclosure. If neighboring blocks adjacent to the current block heavily encode the intra-prediction mode, the intra-prediction block may be given a large weighted value. Conversely, if neighboring blocks adjacent to the current block lightly encode the intra-prediction mode, the intra-prediction block may be given a small weighted value.

Referring to FIG. 9, if the upper neighboring block A and the left neighboring block L of the current block in FIG. 8 encode the intra-predict mode, the weighted value assigned to the intra-predict block may be equal to 3. If the upper neighboring block A encodes the intra-prediction mode and the left neighboring block L does not encode the intra-prediction mode, the weighted value assigned to the intra-prediction block may be equal to 2. If the upper neighboring block A does not encode the intra-prediction mode and the left neighboring block L encodes the intra-prediction mode, the weighted value assigned to the intra-prediction block may be equal to 2. If the upper neighboring block A does not encode the intra-prediction mode and the left neighboring block L does not encode the intra-prediction mode, the weighted value assigned to the intra-prediction block may be equal to 1.

The CIIP mode described in FIGS. 7, 8, and 9 utilizes the intra-prediction mode exclusively with the planar mode and thus does not utilize directional information present around the current block. Furthermore, there is a limitation in the determination of the weighted values because the weighted values are determined based on whether or not the intra-prediction mode is utilized for a particular location block.

FIG. 10 is a diagram illustrating neighboring blocks that are adjacent to the current block, according to at least one embodiment of the present disclosure. In CIIP mode, the intra-prediction mode may be determined by using a histogram of modes.

Referring to FIG. 10, there may be neighboring blocks of the current block. There may be neighboring blocks A through Q. The size of these blocks A through Q may correspond to a minimum unit size for storing intra-prediction mode information. A histogram of modes may be generated based on the intra-prediction modes of neighboring blocks A through Q of the current block. In one example, the histogram of modes may be generated based on the intra-prediction modes of blocks A through D, blocks I through L, and block Q. In one example, a histogram of modes may be generated based on the intra-prediction modes of blocks A through Q. Here, the number and location of neighboring blocks around the current block used to generate the histogram of modes may be arbitrarily determined. If checking the distribution of the histogram of modes shows no tendency, the intra-prediction mode may be determined to be the planar mode.

If the current picture is encoded as a P-slice or B-slice, neighboring blocks of the current block are highly likely to be encoded in inter-prediction mode. In one example, if the intra-prediction modes of the neighboring blocks of the current block are used to generate a histogram of modes, blocks encoded in inter-prediction mode may be assigned a planar mode. In addition to the planar mode, an arbitrary intra-prediction mode may be assigned. In other words, the mode of the block encoded with the inter-prediction mode may be changed to an arbitrary intra-prediction mode, and then a histogram of modes may be generated. For example, when generating a histogram of modes by using the intra-prediction modes of neighboring blocks of the current block, the histogram of modes may be generated by using only blocks encoded with intra-prediction modes, excluding blocks encoded with inter-prediction modes. From the generated histogram of modes, the most frequent mode may be selected. That mode may be used as the intra-prediction mode for the CIIP mode.

Figure 11:
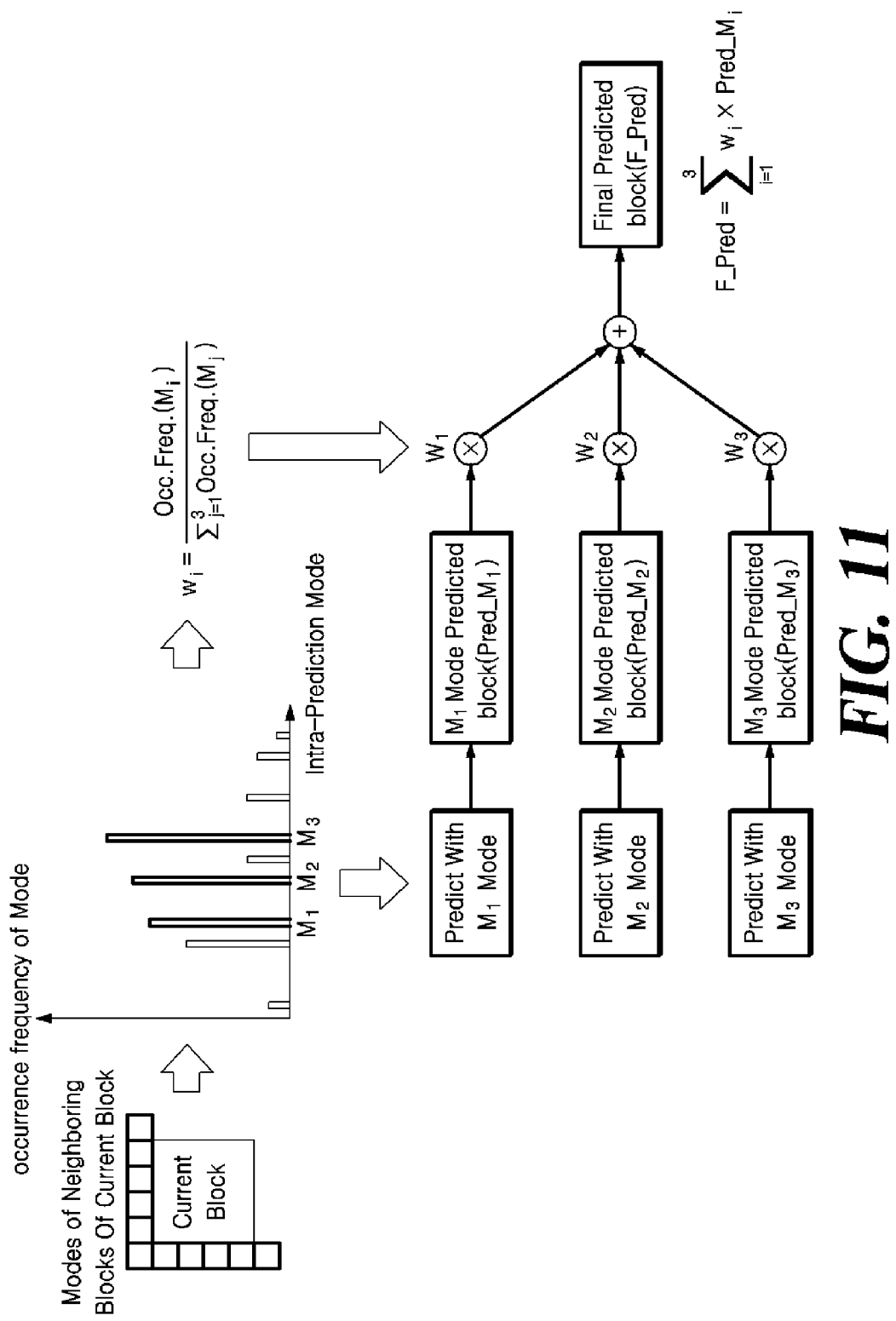
FIG. 11 is a diagram illustrating a method of generating intra-prediction blocks in a combined inter-intra prediction mode by using a histogram of modes, according to at least one embodiment of the present disclosure.

FIG. 11 is a diagram illustrating a method of generating intra-prediction blocks in a combined inter-intra prediction mode by using a histogram of modes, according to at least one embodiment of the present disclosure.

Referring to FIG. 11, the three most frequent intra-prediction modes may be selected from the histogram of modes generated by using the intra-prediction modes of the neighboring blocks of the current block. The three most frequent intra-prediction modes may correspond to $M_1$, $M_2$, and $M_3$ modes, respectively. Based on the $M_1$ mode, $M_2$ mode, and $M_3$ mode, prediction blocks Pred_$M_1$, Pred_$M_2$, and Pred_$M_3$ may be generated, respectively. An intra-prediction block of CIIP mode may be generated by weighted averaging of prediction blocks Pred_$M_1$, Pred_$M_2$, and Pred_$M_3$. The weighted values may be determined based on the mode occurrence frequency in the histogram of modes. The weighted values may be determined by using a template-based sum of absolute transformed differences, a template-based sum of absolute differences (SAD), or a template-based sum of squared error (SSE).

In one example, random three intra-prediction modes may be selected from a histogram of modes generated by using the intra-prediction modes of the neighboring blocks of the current block. Based on the random three intra-prediction modes, three prediction blocks may be generated. A weighted average of these three prediction blocks may be generated to produce an intra-prediction block for the CIIP mode. In one example, a random number of intra-prediction modes may be selected from the histogram of modes. Based on the random number of intra-prediction modes, a random number of prediction blocks may be generated. A CIIP mode intra-prediction block may be generated by weighted averaging the random number of prediction blocks.

A Method of Determining an Intra-Prediction Mode of a CIIP Mode by Using a Template-Based Intra-Prediction Mode Derivation Method Calculating a template-based sum of absolute transformed differences for an intra-prediction mode may mean applying the directionality of the intra-prediction mode to the reference pixels of a template to generate a predicted template pixel and may mean calculating a sum of absolute transformed differences between the generated predicted template pixel and a reconstructed template pixel. By calculating the template-based sum of absolute transformed differences for the intra-prediction modes of all the neighboring reference blocks of the current block, the intra-prediction mode of the CIIP mode may be determined. In FIG. 10, the template-based sum of absolute transformed differences may be calculated for the intra-prediction modes of the top blocks A to H, left blocks I to P, and top left block Q that are neighboring the current block. The mode that produces the least sum of the calculated sum of absolute transformed differences may be determined to be the intra-prediction mode of the CIIP mode. If multiple modes produce the least sum of the calculated sum of absolute transformed differences, the mode that produces the least sum first may be selected. Alternatively, if multiple modes produce the least sum of the calculated sum of absolute transformed differences, the mode that produces the least sum at the end may be selected. Alternatively, if multiple modes produce the least sum of the calculated sum of absolute transformed differences, the present disclosure may generate, based on these multiple modes, multiple prediction blocks, weighted averaging thereof to determine the intra-prediction block of the CIIP mode.

The number and location of neighbor reference blocks of the current block being used may be arbitrarily determined. The number and location of these reference blocks may be determined by taking into account complexity and encoding efficiency. No template-based sum of absolute transformed differences is calculated for duplicate intra-prediction modes. As one example in FIG. 10, the template-based sum of absolute transformed differences may be calculated for the intra-prediction modes of top blocks A through D, left blocks I through L, and top left block Q. As another example in FIG. 10, the template-based sum of absolute transformed differences may be calculated for the intra-prediction mode of top blocks A, C, E, G, left blocks I, K, M, O, and top left block Q.

Further, the intra-prediction mode of the CIIP mode may be determined by calculating the template-based sum of absolute transformed differences for the candidate modes in the MPM list. A prediction template may be generated by applying the directionality of all candidate modes in the MPM list to a reference pixel in the template. The present disclosure may calculate the sum of absolute transformed differences between the pixels in the generated prediction template and the pixels in the already reconstructed template. Among the MPM candidate modes, the candidate mode used to generate the prediction pixel that produces the smallest sum of the calculated sum of absolute transformed differences may be determined as the intra-prediction mode of the CIIP mode. By using the determined intra-prediction mode of the CIIP mode, the CIIP mode intra-prediction block may be generated. By applying a weighted value to the intra-prediction block and inter-prediction block, a final CIIP-based prediction block may be generated.

Figure 12A:
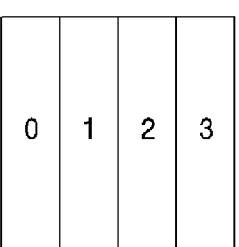

FIG. 12A and FIG. 12B are diagrams illustrating a method of partitioning the current block into subblocks based on intra-prediction modes in a combined inter-intra prediction mode, according to at least one embodiment of the present disclosure. By calculating template-based sum of absolute transformed differences for the intra-prediction modes of all neighbor reference blocks of the current block, an intra-prediction mode of the CIIP mode may be determined. If the determined intra-prediction mode of the CIIP mode is a directional mode, the current block may be partitioned into subblocks. The CIIP mode may be applied to each of the partitioned subblocks.

Referring to FIG. 12A, the current block may be partitioned vertically if the intra-prediction mode of the CIIP mode, which is determined by calculating the template-based sum of absolute transformed differences for the intra-prediction modes of all neighbor reference blocks of the current block, is greater than or equal to mode 2 and less than or equal to mode 34. However, the range of the determined intra-prediction mode of the CIIP mode is not limited to these figures. The current block may be partitioned into a subblock with an index of 0, a subblock with an index of 1, a subblock with an index of 2, and a subblock with an index of 3. Since the current block is partitioned vertically, the subblock with index 0, the subblock with index 1, the subblock with index 2, and the subblock with index 3 may correspond to rectangular shapes with a vertical dimension longer than the horizontal.

Referring to FIG. 12B, the current block may be partitioned horizontally if the intra-prediction mode of the CIIP mode, which is determined by calculating the template-based sum of absolute transformed differences for the intra-prediction modes of all neighbor reference blocks of the current block, is greater than or equal to mode 34 and less than or equal to mode 66. However, the range of the determined intra-prediction mode of the CIIP mode is not limited to these figures. The current block may be partitioned into a subblock with an index of 0, a subblock with an index of 1, a subblock with an index of 2, and a subblock with an index of 3. Because the current block is partitioned horizontally, the subblock with index 0, the subblock with index 1, the subblock with index 2, and the subblock with index 3 may correspond to a rectangular shape with a horizontal dimension longer than the vertical.

FIG. 13 is a diagram illustrating weighted values assigned to subblocks, according to at least one embodiment of the present disclosure. The CIIP mode may be applied to each of the different partitioned subblocks of FIGS. 12A and 12B. Different weights may be assigned to an intra-prediction block and an inter-prediction block of the CIIP mode for each of the different subblocks.

Referring to FIG. 13, in the subblock with index 0 of FIGS. 12A and 12B, the intra-prediction block in CIIP mode may be assigned a weight of 6 and the inter-prediction block in CIIP mode may be assigned a weight of 2. In the subblock with index 1, the intra-prediction block in CIIP mode may be assigned a weight of 5 and the inter-prediction block in CIIP mode may be assigned a weight of 3. In the subblock with index 2, the intra-prediction block in CIIP mode may be assigned a weight of 3 and the inter-prediction block in CIIP mode may be assigned a weight of 5. In the subblock with index 3, the intra-prediction block in CIIP mode may be assigned a weight of 2 and the inter-prediction block in CIIP mode may be assigned a weight of 6.

Figure 14:
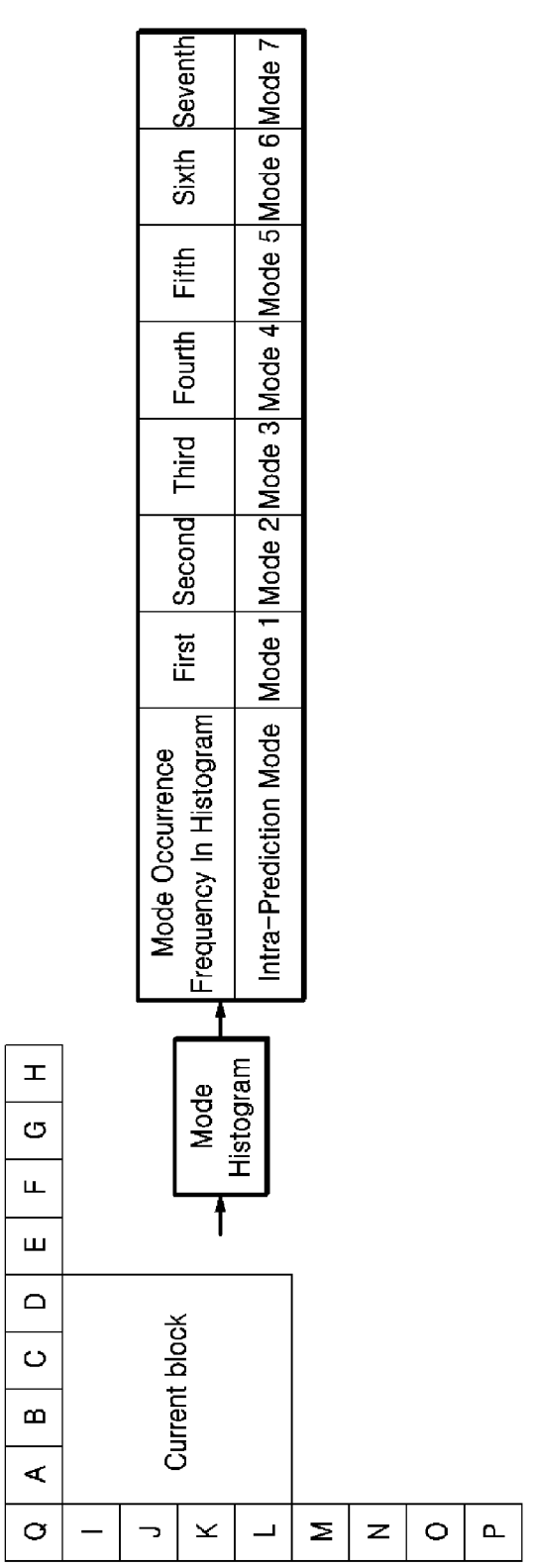
FIG. 14 is a diagram illustrating a histogram of modes of neighboring blocks adjacent to the current block, according to at least one embodiment of the present disclosure.

FIG. 14 is a diagram illustrating a histogram of modes of neighboring blocks adjacent to the current block, according to at least one embodiment of the present disclosure.

Referring to FIG. 14, a histogram of modes of the neighboring blocks of the current block may be constructed. In the generated histogram of modes, the modes may be arranged based on descending order of frequency of occurrence of the modes by default. Accordingly, the modes may be arranged by their high frequency to decreasing frequencies of occurrence. Mode 1, Mode 2, Mode 3, Mode 4, Mode 5, Mode 6, and Mode 7 may represent arbitrary intra-prediction modes. Mode 1, Mode 2, Mode 3, Mode 4, Mode 5, Mode 6, and Mode 7 may represent intra-prediction modes of the neighboring blocks of the current block. If multiple intra-prediction modes exist with the same frequency of occurrence, the intra-prediction modes may be ordered from the lowest to highest mode number. Alternatively, the intra-prediction modes may be ordered from the highest to lowest mode number.

Figure 15:
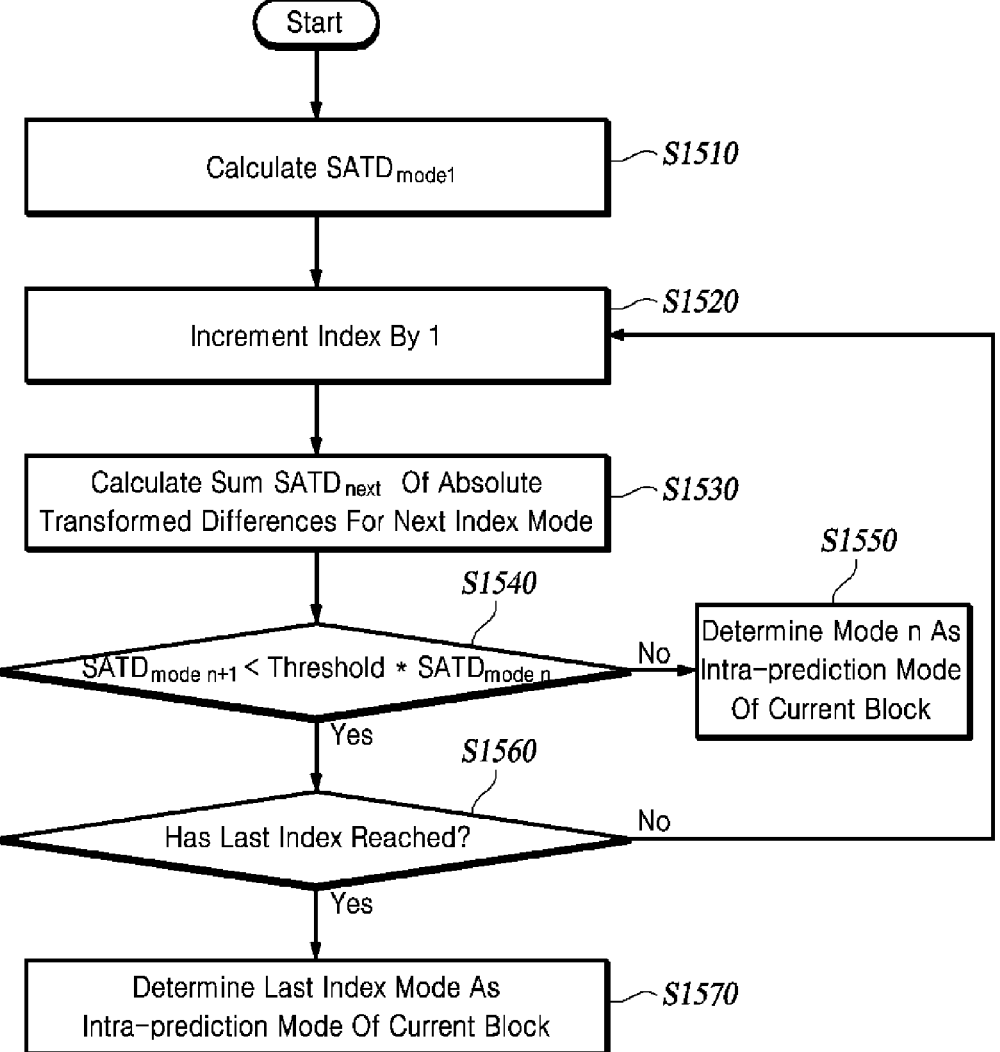
FIG. 15 is a diagram illustrating a process for deriving template-based intra-prediction modes by using a histogram of modes of neighboring blocks of the current block, according to at least one embodiment of the present disclosure.

FIG. 15 is a diagram illustrating a process for deriving template-based intra-prediction modes by using a histogram of modes of neighboring blocks of the current block, according to at least one embodiment of the present disclosure.

Referring to FIG. 15, from the histogram of modes generated in FIG. 14, a template-based sum $\text{SATD}_{mode\ 1}$ of absolute transformed differences for the first index mode, i.e., mode 1, may be calculated (S1510). The index may be incremented by 1 (S1520). A sum $\text{SATD}_{next}$ of absolute transformed differences for the next index mode may be calculated (S1530). Whether $\text{SATD}_{mode\ n+1} <$ Threshold$*\text{SATD}_{mode\ n}$ may be determined (S1540). Here, $\text{SATD}_{mode\ n+1}$ may correspond to the sum of absolute transformed differences for Mode 2 and $\text{SATD}_{mode\ n}$ may correspond to the sum of absolute transformed differences for Mode 1. $\text{SATD}_{mode\ n+1}$ may correspond to $\text{SATD}_{next}$, which is the sum of absolute transformed differences for the next index mode. A threshold may be any value as long as Threshold>0. If $SATD_{mode\ n+1}$ does not satisfy $SATD_{mode\ n+1}<Threshold*SATD_{mode\ n}$ (S1540—NO), then Mode n may be determined to be the intra-prediction mode of CIIP mode (S1550). If $SATD_{mode\ n+1}<Threshold*SATD_{mode\ n}$ (S1540—YES), it may be determined whether mode n+1 corresponds to the last index mode (S1560). If mode n+1 is the last index mode (S1560—YES), then the last index mode may be determined to be the intra-prediction mode of the CIIP mode (S1570). The last index mode may correspond to mode 7. If mode n+1 is not the last index mode (S1560—NO), the index may be incremented by 1. The sum of absolute transformed differences may be calculated for the incremented index mode.

In this way, the process of comparing the template-based sum of absolute transformed differences may end when the template-based sum of absolute transformed differences for the mode with the smaller index number is less than the template-based sum of absolute transformed differences for the mode with the larger index number. In this case, the mode with the smaller index number may be determined to be the intra-prediction mode of the CIIP mode. Alternatively, the process of comparing the template-based sum of absolute transformed differences may terminate if the index number currently being compared is the last index in the mode histogram. In this way, complexity can be reduced. In addition to the template-based sum of absolute transformed differences, various methods may be used, such as the template-based sum of absolute differences or the template-based sum of squared errors.

Figure 16A:
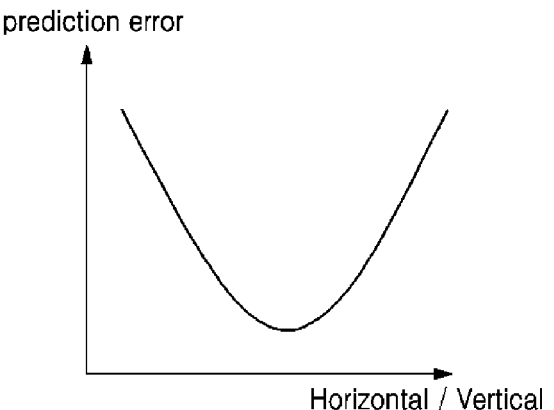
FIGS. 16A and 16B are diagrams illustrating an error distribution of inter predictions and an error distribution of intra predictions, according to at least one embodiment of the present disclosure.
Figure 16B:
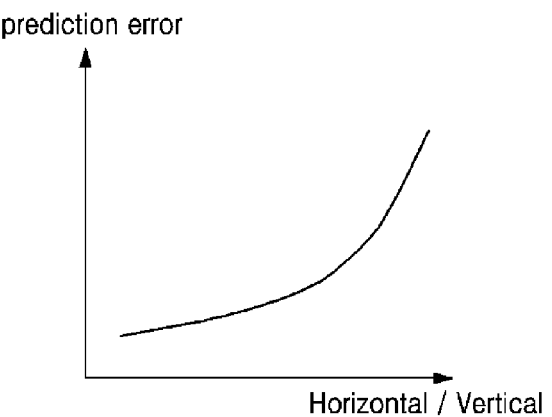

FIGS. 16A and 16B are diagrams illustrating an error distribution of inter predictions and an error distribution of intra predictions, according to at least one embodiment of the present disclosure.

Referring to FIG. 16A, the error distribution of the inter predictions may be dependent on horizontal/vertical coordinate values. In an inter prediction, a motion vector may be used relative to the center of the current block. Accordingly, the error of the inter prediction may increase as one moves outwardly from the center of the current block.

Referring to FIG. 16B, the error distribution of the intra predictions may be dependent on horizontal/vertical coordinate values. In an intra prediction, a reference block used in the prediction may be at the top left of the current block. Accordingly, the error of the intra prediction may increase from the top left to the bottom right.

FIGS. 17A and 17B are diagrams illustrating weighted values of an intra prediction of an 8×8 block and weighted values of an inter prediction of the 8×8 block, according to at least one embodiment of the present disclosure. In an intra prediction, a reference block used in the prediction may be at the top left corner of the current block. Accordingly, the top-left region of the current block may bring a large weighted value to be assigned to the intra-prediction signals, and the bottom-right region of the current block may bring a large weighted value to be assigned to the inter-prediction signals.

Referring to FIG. 17A, in the 8×8 sized block, the top-left region may bring a large weighted value to be assigned to the intra-prediction signals and the bottom-right region may bring a small weighted value to be assigned to the intra-prediction signals.

Referring to FIG. 17B, in the 8×8 sized block, the bottom-right region may bring a large weighted value to be assigned to the inter-prediction signals and the top-left region may bring a small weighted value to be assigned to the inter-prediction signals. However, the present disclosure is not limited to the aforementioned embodiments. The size and shape of the blocks may be arbitrary sizes and shapes. The weighted values assigned may be arbitrary weighted values.

FIGS. 18A and 18B are diagrams illustrating weighted values of an intra prediction of a block of size 8×8 and weighted values of an inter prediction of a block of size 8×8, according to another embodiment of the present disclosure. In the inter prediction, a motion vector may be used relative to the center of the current block. Accordingly, the center region of the current block may bring a large weighted value to be assigned to the inter-prediction signal, and the edge regions of the current block may bring a large weighted value to be assigned to the intra-prediction signal.

Referring to FIG. 18A, in an 8×8 sized block, the center region may bring a small weighted value to be assigned to the intra-prediction signal, and the edge regions may bring a large weighted value to be assigned to the intra-prediction signal.

Referring to FIG. 18B, in the 8×8 sized block, the center region may bring a large weighted value to be assigned to the inter-prediction signal and the edge regions may bring a small weighted value to be assigned to the inter-prediction signal. However, the present disclosure is not limited to these embodiments. The size and shape of the blocks may be arbitrary sizes and shapes. The weighted values assigned may be arbitrary weighted values.

Figure 19:
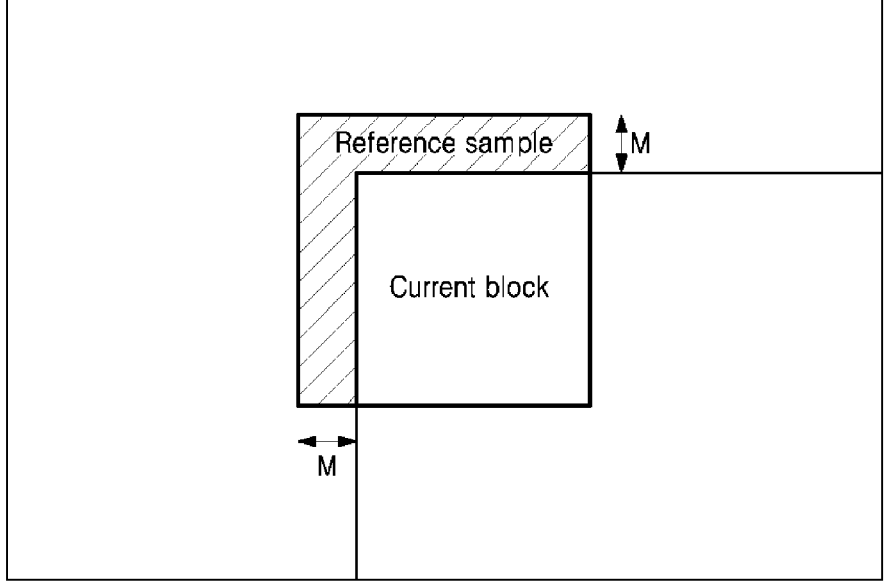
FIG. 19 is a diagram illustrating the current block's neighboring reference pixels to which a sobel filter is applied, according to at least one embodiment of the present disclosure.

FIG. 19 is a diagram illustrating the current block's neighboring reference pixels to which a sobel filter is applied, according to at least one embodiment of the present disclosure. Directionality may be predicted based on the neighbor reference pixels of the current block. Based on the predicted directionality, the intra-prediction mode of the CIIP mode may be determined.

Referring to FIG. 19, there may be reconstructed reference pixels in the neighbor reference sample of the current block. A Sobel filter may be applied to the reconstructed reference pixels to calculate the gradient of those pixels. By using the calculated gradient, a histogram of gradients may be generated. The gradient with the largest value may be selected from the histogram of gradients. The selected gradient may be mapped to an intra-prediction mode. The mapped intra-prediction mode may be determined to be the intra-prediction mode of the CIIP mode. Here, the size M of the reference sample may correspond to any integer greater than or equal to 1. So, the reference pixels to which the Sobel filter is applied may extend from reference pixels of a single line to reference pixels of multiple lines.

Figure 20:
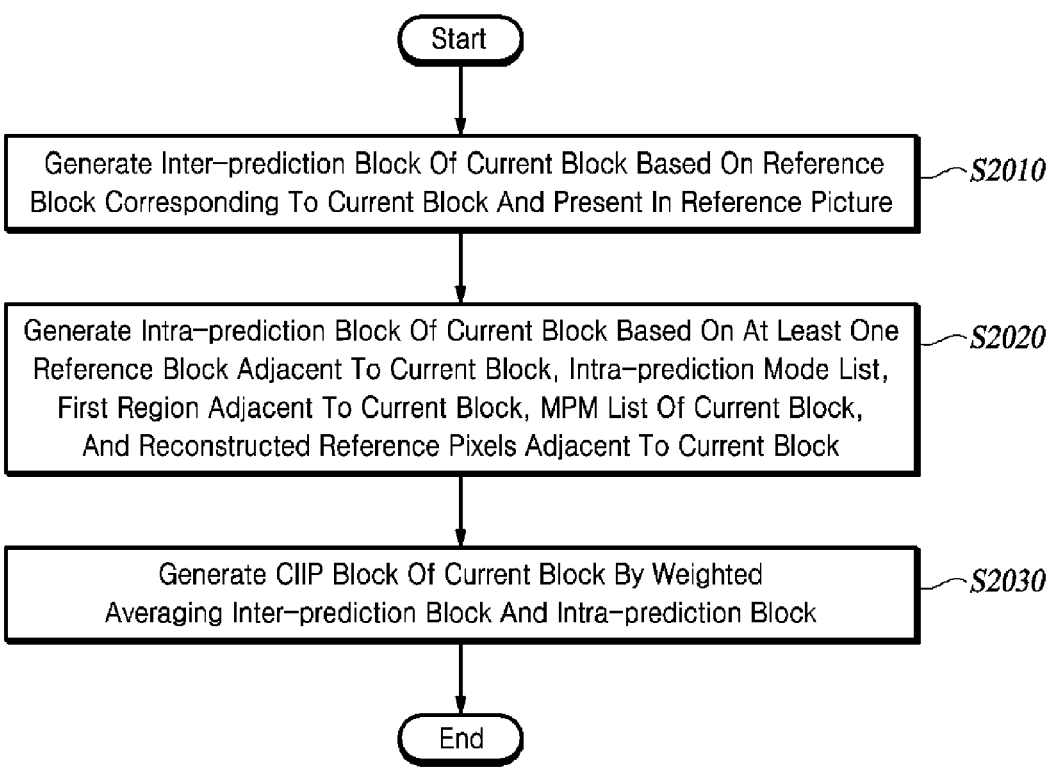
FIG. 20 is a diagram illustrating a video decoding process, according to at least one embodiment of the present disclosure.

FIG. 20 is a diagram illustrating a video decoding process, according to at least one embodiment of the present disclosure.

Referring to FIG. 20, the decoding apparatus may generate an inter-prediction block of the current block based on a reference block corresponding to the current block and present in the reference picture (S2010). The decoding apparatus may generate an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block (S2020). The step of generating the intra-prediction block of the current block may include generating an intra-prediction mode list based on intra-prediction modes of the at least one reference block adjacent to the current block. The step of generating the intra-prediction block of the current block may also include selecting an intra-prediction mode from the intra-prediction mode list. The step of generating the intra-prediction block of the current block may also include generating the intra-prediction block based on the intra-prediction mode. Here, the intra-prediction mode may be selected based on a mode occurrence frequency. The step of generating the intra-prediction block of the current block may include generating an intra-prediction mode list based on intra-prediction modes of the at least one reference block adjacent to the current block. The step of generating the intra-prediction block of the current block may also include selecting at least one intra-prediction mode from the intra-prediction mode list. The step of generating the intra-prediction block of the current block may also include generating at least one prediction block based on the at least one intra-prediction mode. The step of generating the intra-prediction block of the current block may also include generating the intra-prediction block by weighted averaging the at least one prediction block. Here, the at least one intra-prediction mode may be selected based on the mode occurrence frequency.

The step of generating the intra-prediction block of the current block may include generating prediction pixels by applying intra-prediction modes of the at least one reference block adjacent to the current block, to reference pixels in the first region adjacent to the current block. The step of generating the intra-prediction block of the current block may also include calculating sum of absolute transformed differences between the prediction pixels and reconstructed pixels in the first region. The step of generating the intra-prediction block of the current block may also include deriving an intra-prediction mode of the current block based on the sum of absolute transformed differences. The step of generating the intra-prediction block of the current block may also include generating the intra-prediction block based on the intra-prediction mode of the current block. Here, the intra-prediction mode of the current block may correspond to an intra-prediction mode of a reference block that was used to generate a prediction pixel that causes the least sum of absolute transformed differences. The step of generating the intra-prediction block of the current block may include generating an intra-prediction mode list based on intra-prediction modes of the at least one reference block adjacent to the current block. The step of generating the intra-prediction block of the current block may also include deriving an intra-prediction mode of the current block from the intra-prediction mode list based on the sum of absolute transformed differences and the mode occurrence frequency. The step of generating the intra-prediction block of the current block may also include generating the intra-prediction block based on the intra-prediction mode of the current block.

The step of generating the intra-prediction block of the current block may include applying a Sobel filter to a reference pixel that is reconstructed and adjacent to the current block to calculate a gradient of the reference pixel. The step of generating the intra-prediction block of the current block may also include generating a gradient list based on the gradient of the reference pixel. The step of generating the intra-prediction block of the current block may also include selecting one gradient from the gradient list. The step of generating the intra-prediction block of the current block may also include deriving an intra-prediction mode of the current block based on the one gradient. The step of generating the intra-prediction block of the current block may also include generating the intra-prediction block based on the intra-prediction mode of the current block. Here, the one gradient may be selected based on size of gradients. The step of generating the intra-prediction block of the current block may include generating prediction pixels by applying candidate modes in the MPM list of the current block to reference pixels in the first region adjacent to the current block. The step of generating the intra-prediction block of the current block may also include calculating sum of absolute transformed differences between the prediction pixels and reconstructed pixels in the first region. The step of generating the intra-prediction block of the current block may also include deriving an intra-prediction mode of the current block based on the sum of absolute transformed differences. The step of generating the intra-prediction block of the current block may also include generating the intra-prediction block based on the intra-prediction mode of the current block. Here, the intra-prediction mode of the current block may correspond to a candidate mode utilized to generate a prediction pixel that causes the least sum of absolute transformed differences.

The decoding apparatus may generate a Combined Inter-Intra Prediction (CIIP) block for the current block by weighted averaging the inter-prediction block and the intra-prediction block (S2030). The weighted values utilized in the weighted averaging may be derived based on at least one of an error distribution of intra prediction or an error distribution of inter prediction. The step of generating the CIIP block of the current block may include partitioning the current block into four subblocks based on the directionality of the intra-prediction mode of the current block. The step of generating the CIIP block of the current block may also include generating the CIIP block of the current block by weighted averaging the inter-prediction block and the intra-prediction block for each of the four subblocks. Here, the current block may be partitioned vertically or horizontally based on the directionality of the intra-prediction mode of the current block. The four subblocks may each have a different weighted value utilized in the weighted averaging.

Figure 21:
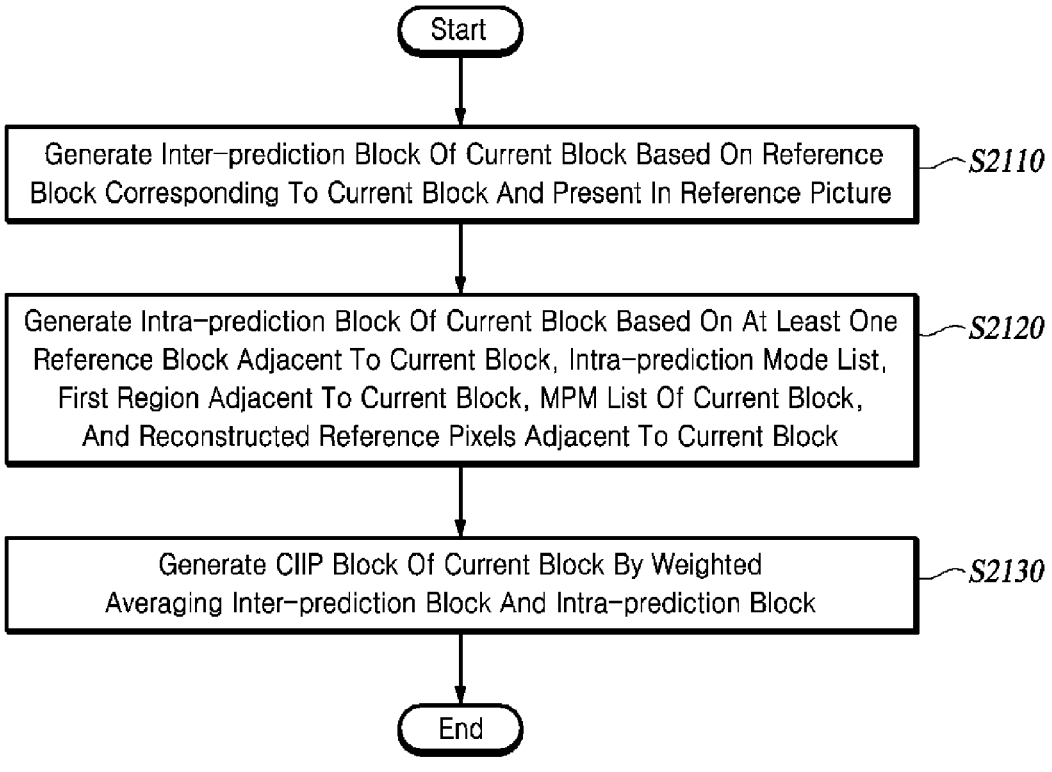
FIG. 21 is a diagram illustrating a video encoding process, according to at least one embodiment of the present disclosure.

FIG. 21 is a diagram illustrating a video encoding process, according to at least one embodiment of the present disclosure.

Referring to FIG. 21, the encoding apparatus may generate an inter-prediction block of the current block based on a reference block corresponding to the current block and present in the reference picture (S2110). The encoding apparatus may generate an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block (S2120). The step of generating the intra-prediction block of the current block may include generating an intra-prediction mode list based on intra-prediction modes of the at least one reference block adjacent to the current block. The step of generating the intra-prediction block of the current block may also include selecting an intra-prediction mode from the intra-prediction mode list. The step of generating the intra-prediction block of the current block may also include generating the intra-prediction block based on the intra-prediction mode. Here, the intra-prediction mode may be selected based on the mode occurrence frequency. The step of generating the intra-prediction block of the current block may include generating an intra-prediction mode list based on intra-prediction modes of the at least one reference block adjacent to the current block. The step of generating the intra-prediction block of the current block may also include selecting at least one intra-prediction mode from the intra-prediction mode list. The step of generating the intra-prediction block of the current block may also include generating at least one prediction block based on the at least one intra-prediction mode. The step of generating the intra-prediction block of the current block may also include generating the intra-prediction block by weighted averaging the at least one prediction block. Here, the at least one intra-prediction mode may be selected based on the mode occurrence frequency.

The step of generating the intra-prediction block of the current block may include generating prediction pixels by applying intra-prediction modes of the at least one reference block adjacent to the current block, to reference pixels in the first region adjacent to the current block. The step of generating the intra-prediction block of the current block may include calculating the sum of absolute transformed differences between the prediction pixels and reconstructed pixels in the first region. The step of generating the intra-prediction block of the current block may include determining an intra-prediction mode of the current block based on the sum of absolute transformed differences. The step of generating the intra-prediction block of the current block may include generating the intra-prediction block based on the intra-prediction mode of the current block. Here, the intra-prediction mode of the current block may correspond to an intra-prediction mode of a reference block utilized to generate a prediction pixel that causes the least sum of absolute transformed differences. The step of generating the intra-prediction block of the current block may include generating an intra-prediction mode list based on intra-prediction modes of the at least one reference block adjacent to the current block. The step of generating the intra-prediction block of the current block may also include determining an intra-prediction mode of the current block from the intra-prediction mode list based on the sum of absolute transformed differences and the mode occurrence frequency. The step of generating the intra-prediction block of the current block may also include generating the intra-prediction block based on the intra-prediction mode of the current block.

The step of generating the intra-prediction block of the current block may include calculating a gradient of the reference pixel by applying a Sobel filter to a reference pixel that is reconstructed and adjacent to the current block. The step of generating the intra-prediction block of the current block may also include generating a gradient list based on the gradient of the reference pixel. The step of generating the intra-prediction block of the current block may also include selecting one gradient from the gradient list. The step of generating the intra-prediction block of the current block may also include determining an intra-prediction mode of the current block based on the one gradient. The step of generating the intra-prediction block of the current block may also include generating the intra-prediction block based on the intra-prediction mode of the current block. Here, the one gradient may be selected based on size of gradients. The step of generating the intra-prediction block of the current block may include generating prediction pixels by applying candidate modes in the MPM list, to reference pixels in the first region adjacent to the current block. The step of generating the intra-prediction block of the current block may include calculating sum of absolute transformed differences between the prediction pixels and reconstructed pixels in the first region, determining an intra-prediction mode of the current block based on the sum of absolute transformed differences. The step of generating the intra-prediction block of the current block may include generating the intra-prediction block based on the intra-prediction mode of the current block. Here, the intra-prediction mode of the current block may correspond to a candidate mode utilized to generate a prediction pixel that causes the least sum of absolute transformed differences.

The encoding apparatus may generate a CIIP block of the current block by weighted averaging the inter-prediction block and the intra-prediction block (S2130). A weighting value utilized in the weighted averaging may be determined based on at least one of error distribution of the intra prediction or an error distribution of the inter prediction. The step of generating the CIIP block of the current block may include partitioning the current block into four subblocks based on directionality of the intra-prediction mode of the current block. The step of generating the CIIP block of the current block may also include generating the CI IP block of the current block by weighted averaging the inter-prediction block and the intra-prediction block for each of the four subblocks. Here, the current block may be partitioned vertically or horizontally based on the directionality of the intra-prediction mode of the current block. The four subblocks may each have a different weighted value utilized in the weighted averaging.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

REFERENCE NUMBER

122: intra predictor
510: entropy decoder

25

542: intra predictor
What is claimed is:

1. A video decoding method, comprising:
generating an inter-prediction block of a current block based on a reference block corresponding to the current block and present in a reference picture;
generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block; and
generating a combined inter-intra prediction (CIIP) block of the current block by weighted averaging the inter-prediction block and the intra-prediction block,
wherein generating the intra-prediction block of the current block comprises:
determining at least one intra-prediction mode based on mode occurrence frequency of intra-prediction modes of reference blocks adjacent to the current block; and
generating intra-prediction block of the current block based on the at least one intra-prediction mode.

2. The video decoding method of claim 1,
wherein weighted values assigned to the intra prediction block decrease from a top-left region toward a bottom-right region of the current block, and
wherein weighted values assigned to the inter prediction block decrease from the bottom-right region toward the top-left region of the current block.

3. The video decoding method of claim 1,
wherein weighted values assigned to the intra prediction block increase from a center region toward edge regions of the current block, and
wherein weighted values assigned to the inter prediction block increase from the edge regions toward the center region of the current block.

4. The video decoding method of claim 1, wherein generating the intra-prediction block of the current block comprises:
generating prediction pixels by applying intra-prediction modes of the at least one reference block adjacent to the current block, to reference pixels of a first region adjacent to the current block;
calculating sum of absolute transformed differences between the prediction pixels and reconstructed pixels in the first region;
deriving an intra-prediction mode of the current block based on the sum of absolute transformed differences; and
generating the intra-prediction block based on the intra-prediction mode of the current block, and
wherein the intra-prediction mode of the current block is an intra-prediction mode of a reference block utilized to generate a prediction pixel that causes a least sum of absolute transformed differences.

5. The video decoding method of claim 1, wherein generating the intra-prediction block of the current block comprises:
generating an intra-prediction mode list based on intra-prediction modes of the at least one reference block adjacent to the current block;
deriving an intra-prediction mode of the current block from the intra-prediction mode list based on sum of absolute transformed differences and a mode occurrence frequency; and

generating the intra-prediction block based on the intra-prediction mode of the current block.

6. The video decoding method of claim 1, wherein generating the intra-prediction block of the current block comprises:
applying a Sobel filter to a reference pixel that is reconstructed and adjacent to the current block to calculate a gradient of the reference pixel;
generating a gradient list based on the gradient of the reference pixel;
selecting one gradient from the gradient list;
deriving an intra-prediction mode of the current block based on the one gradient; and
generating the intra-prediction block based on the intra-prediction mode of the current block, and
wherein the one gradient is selected based on size of gradients.

7. The video decoding method of claim 1, wherein generating the intra-prediction block of the current block comprises:
generating prediction pixels by applying candidate modes in the MPM list of the current block to reference pixels of a first region adjacent to the current block;
calculating sum of absolute transformed differences between the prediction pixels and reconstructed pixels in the first region;
deriving an intra-prediction mode of the current block based on the sum of absolute transformed differences; and
generating the intra-prediction block based on the intra-prediction mode of the current block,
wherein the intra-prediction mode of the current block is a candidate mode utilized to generate a prediction pixel that causes a least sum of absolute transformed differences.

8. The video decoding method of claim 1, wherein weighted values utilized in the weighted averaging are derived based on at least one of an error distribution of intra prediction or an error distribution of inter prediction.

9. The video decoding method of claim 4, wherein generating the CIIP block of the current block comprises:
partitioning the current block into four subblocks based on directionality of the intra-prediction mode of the current block; and
generating the CIIP block of the current block by weighted averaging the inter-prediction block and the intra-prediction block for each of the four subblocks.

10. The video decoding method of claim 9, wherein the current block is partitioned vertically or horizontally based on directionality of the intra-prediction mode of the current block, and
wherein the four subblocks each have a different weighted value utilized in the weighted averaging.

11. A video encoding method, comprising:
generating an inter-prediction block of a current block based on a reference block corresponding to the current block and present in a reference picture;
generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block; and
generating a combined inter-intra prediction (CIIP) block of the current block by weighted averaging the inter-prediction block and the intra-prediction block, wherein generating the intra-prediction block of the current block comprises:

determining at least one intra-prediction mode based on mode occurrence frequency of intra-prediction modes of reference blocks adjacent to the current block; and generating intra-prediction block of the current block based on the at least one intra-prediction mode.

12. The video encoding method of claim 11, wherein weighted values assigned to the intra prediction block decrease from a top-left region toward a bottom-right region of the current block, and wherein weighted values assigned to the inter prediction block decrease from the bottom-right region toward the top-left region of the current block.

13. The video encoding method of claim 11, wherein weighted values assigned to the intra prediction block increase from a center region toward edge regions of the current block, and wherein weighted values assigned to the inter prediction block increase from the edge regions toward the center region of the current block.

14. The video encoding method of claim 11, wherein generating the intra-prediction block of the current block comprises:

generating prediction pixels by applying intra-prediction modes of the at least one reference block adjacent to the current block, to reference pixels of a first region adjacent to the current block;

calculating sum of absolute transformed differences between the prediction pixels and reconstructed pixels in the first region;

determining an intra-prediction mode of the current block based on the sum of absolute transformed differences; and generating the intra-prediction block based on the intra-prediction mode of the current block, and wherein the intra-prediction mode of the current block is an intra-prediction mode of a reference block utilized to generate a prediction pixel that causes a least sum of absolute transformed differences.

15. The video encoding method of claim 11, wherein generating the intra-prediction block of the current block comprises:

generating an intra-prediction mode list based on intra-prediction modes of the at least one reference block adjacent to the current block;

determining an intra-prediction mode of the current block from the intra-prediction mode list based on sum of absolute transformed differences and a mode occurrence frequency; and generating the intra-prediction block based on the intra-prediction mode of the current block.

16. The video encoding method of claim 11, wherein generating the intra-prediction block of the current block comprises:

calculating a gradient of the reference pixel by applying a Sobel filter to a reference pixel that is reconstructed and adjacent to the current block;

generating a gradient list based on the gradient of the reference pixel;

selecting one gradient from the gradient list;

determining an intra-prediction mode of the current block based on the one gradient; and generating the intra-prediction block based on the intra-prediction mode of the current block, and wherein the one gradient is selected based on size of gradients.

17. The video encoding method of claim 11, wherein generating the intra-prediction block of the current block comprises:

generating prediction pixels by applying candidate modes in the MPM list of the current block, to reference pixels of a first region adjacent to the current block;

calculating sum of absolute transformed differences between the prediction pixels and reconstructed pixels in the first region;

determining an intra-prediction mode of the current block based on the sum of absolute transformed differences; and generating the intra-prediction block based on the intra-prediction mode of the current block, and wherein the intra-prediction mode of the current block is a candidate mode utilized to generate a prediction pixel that causes a least sum of absolute transformed differences.

18. The video encoding method of claim 14, wherein generating the CIIP block of the current block comprises:

partitioning the current block into four subblocks based on directionality of the intra-prediction mode of the current block; and generating the CIIP block of the current block by weighted averaging the inter-prediction block and the intra-prediction block for each of the four subblocks.

19. The video encoding method of claim 18, wherein the current block is partitioned vertically or horizontally based on directionality of the intra-prediction mode of the current block, and wherein the four subblocks each have a different weighted value utilized in the weighted averaging.

20. A method for providing a video decoding apparatus with video data, the method comprising:

encoding the video data into a bitstream; and transmitting the bitstream to the video decoding apparatus, wherein encoding the video data comprises:

generating an inter-prediction block of a current block based on a reference block corresponding to the current block and present in a reference picture;

generating an intra-prediction block of the current block based on at least one of at least one reference block adjacent to the current block, an intra-prediction mode list, a first region adjacent to the current block, a most probable mode (MPM) list of the current block, or reconstructed reference pixels adjacent to the current block; and generating a combined inter-intra prediction (CIIP) block of the current block by weighted averaging the inter-prediction block and the intra-prediction block, wherein generating the intra-prediction block of the current block comprises:

determining at least one intra-prediction mode based on mode occurrence frequency of intra-prediction modes of reference blocks adjacent to the current block; and generating intra-prediction block of the current block based on the at least one intra-prediction mode.

* * * * *